United States Patent [19]

Droit

[11] Patent Number: 4,723,131

[45] Date of Patent: Feb. 2, 1988

[54] PRINTHEAD FOR INK JET PRINTING APPARATUS

[75] Inventor: Jimmy L. Droit, Herrin, Ill.

[73] Assignee: Diagraph Corporation, Herrin, Ill.

[21] Appl. No.: 906,438

[22] Filed: Sep. 12, 1986

[51] Int. Cl.[4] .............................................. G01D 15/16

[52] U.S. Cl. ....................................... 346/75; 118/313; 251/61.1; 251/331; 346/140 R

[58] Field of Search ................. 346/75, 140; 251/61.1, 251/331; 118/313

[56] References Cited

U.S. PATENT DOCUMENTS 3,100,002 8/1963 Moore ............................ 251/61.1 X
4,450,375 5/1984 Siegal .................................. 310/331
4,576,111 3/1986 Slomianny ........................... 118/313

*Primary Examiner*—Joseph W. Hartary
*Attorney, Agent, or Firm*—Senniger, Powers, Leavitt and Roedel

[57] ABSTRACT

A printhead for an ink jet printing apparatus comprising a body having a recess in its back face, and a plurality of bosses extending from the bottom of the recess with an orifice extending through each boss; a flexible membrane over the recess forming a chamber for ink supplied from a source under pressure, the membrane engageable with the back ends of the bosses for closing the orifices; a plurality of relatively slender elongate members one for each boss extending rearward from the back of the membrane, each of the elongate members being generally aligned at its inner end with its respective boss; means at the outer end of each elongate member operable by the elongate member for releasing the membrane from the respective boss to enable the membrane to flex away from the respective boss for delivery of a drop of ink from the chamber through the respective orifice, the release means being arranged in an array spread out relative to the bosses with the elongate members extending from a relatively closely spaced array at their inner ends to the release means in their spread-out array. As shown in FIG. 1 the elongate members can be air tubes, and the release means can be electrically operated air valves which supply air through the tubes to hold and release the membrane. As shown in FIG. 9, the elongate members can be flexible wires and the release means can be solenoids which operate the wires to hold and release the membrane.

6 Claims, 10 Drawing Figures

PRINTHEAD FOR INK JET PRINTING APPARATUS

BACKGROUND AND SUMMARY OF THE INVENTION

This invention relates to printheads for ink jet printing apparatus, and more particularly to a printhead of this class having a plurality of jet orifices arranged in a matrix for discharging droplets of ink to print alphanumeric characters or other symbols on a surface moving past the printhead.

Reference may be made to U.S. Pat. Nos. 4,215,350, 4,378,564, 4,542,386, 4,450,375, 4,555,719 and 4,576,111 for their disclosures of printheads of this class.

Cross-reference may be made to the copending coassigned U.S. Pat. application Ser. No. 851,347 filed Apr. 14, 1986 for a disclosure of a printhead on which, in certain respects, the present invention is an improvement.

Among the several objects of the invention may be noted the provision of an improved printhead of the class described which has a relatively simple, compact, integrated ink jet orifice structure in which the ink jet orifices may be relatively closely spaced for printing relatively small characters; the provision of such a printhead which is reliable in operation and capable of ink jet printing with accurate, well-defined character formation; the provision of such a printhead which has relatively few moving parts, may be manufactured at relatively low cost, and which is easily dissassembled for cleaning, when necessary; and the provision of such a printhead which is capable of adjustment to compensate for tolerance variations, and for accurate control of the droplets.

The printhead of this invention thus comprises a body with a recess in its back face. A plurality of bosses extend back from the bottom of the recess with an orifice extending through each boss. A flexible membrane is mounted over the recess to form a chamber for ink supplied from a source under pressure. The membrane can engage the back ends of the bosses for closing the back ends of the orifices. The bosses and orifices are arranged in a close-spaced matrix.

Means is provided to hold the membrane against the back end of each boss and selectively release the membrane to allow it to flex away from the boss to deliver a drop of ink from the chamber to the orifice. This means comprises a slender, elongate member for each boss, the inner end of each elongate member being aligned with its respective boss and thus being arranged in a close array corresponding to the matrix. Means at the outer end of each elongate member, operating via the elongate member, releases the membrane. These release means are larger than the spacing of the bosses and cannot be aligned therewith, and therefore are arranged in a spread-out array with the elongate members extending from the closely spaced array at their inner ends to the release means in their spread-out array.

In a first embodiment, the elongate members are air tubes, and the release means are valves. Each valve is supplied with air under pressure. When the valve is not energized, the air is supplied to the tubes so the pressure holds the membrane against the respective bosses. When the valve is energized, the air supply to the tube is momentarily cut off, momentarily releasing the membrane and allowing a drop of ink to pass from the chamber to the orifice.

In a second embodiment, the elongate members are flexible wires having heads for pressing against the membrane and the release means are solenoids. The solenoids, when energized, momentarily pull the wire and the respective head away from the membrane, releasing the membrane and allowing a drop of ink to pass from the chamber to the orifice.

Other objects and features will be in part apparent and in part pointed out hereinafter.

BRIEF DESCRIPTION OF THE DRAWINGS

Corresponding reference characters indicate corresponding parts throughout the several views of the drawings.

DETIALED DESCRIPTION OF THE PREFERRED EMBODIMENTS

Figure 1:
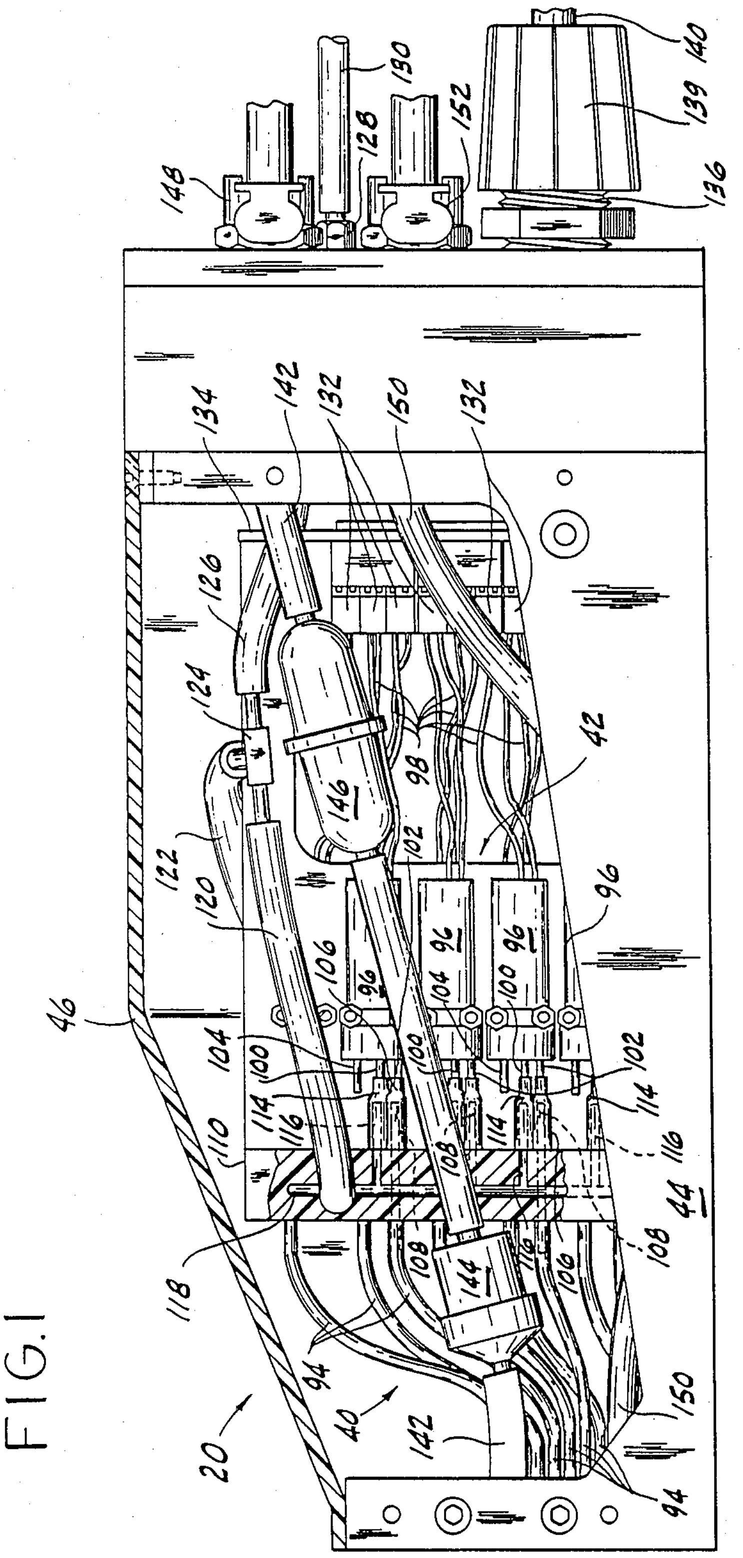
FIG. 1 is a view in elevation of one side of a first embodiment of a printhead for an ink jet printing apparatus constructed according to the principles of this invention, with a part of the cowling removed to show the interior.
Figure 2:
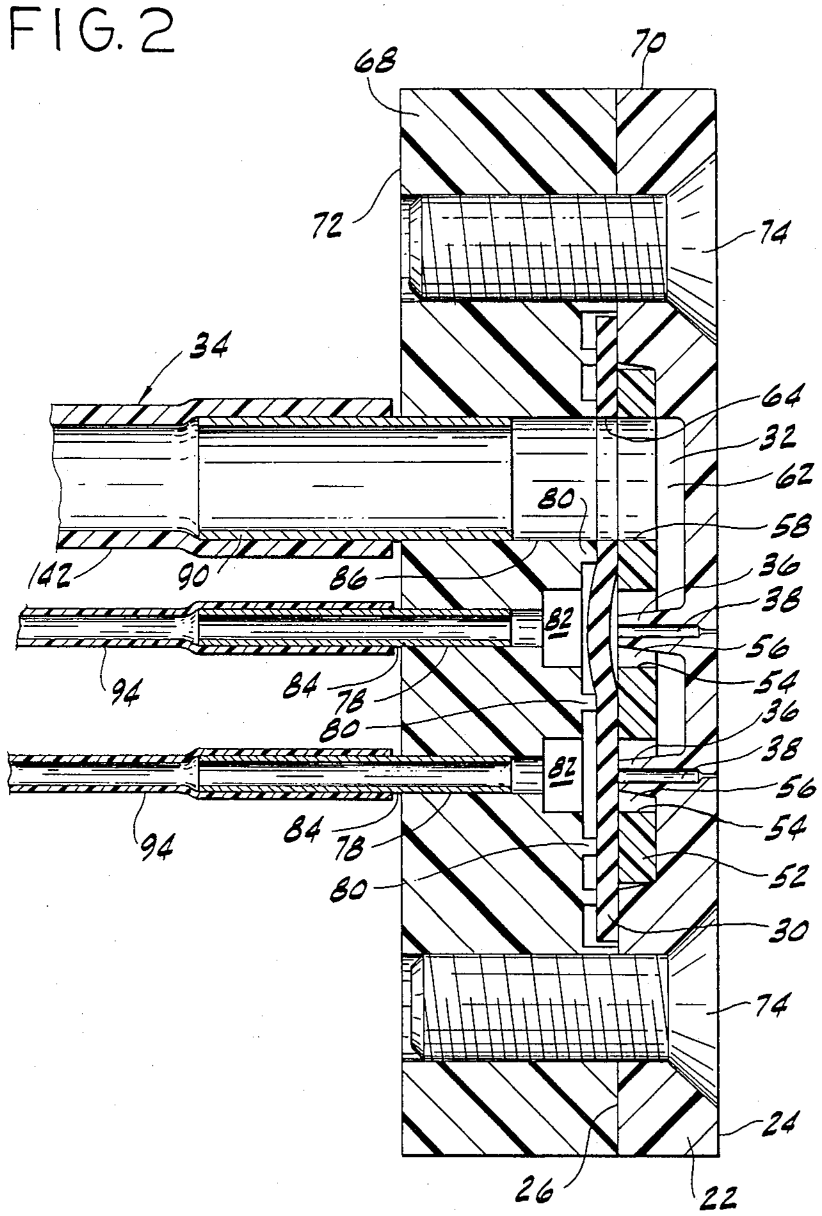
FIG. 2 is an enlarged cross-sectional view of the orifice portion of the printhead, showing the body, membrane, and back plate.
Figure 3:
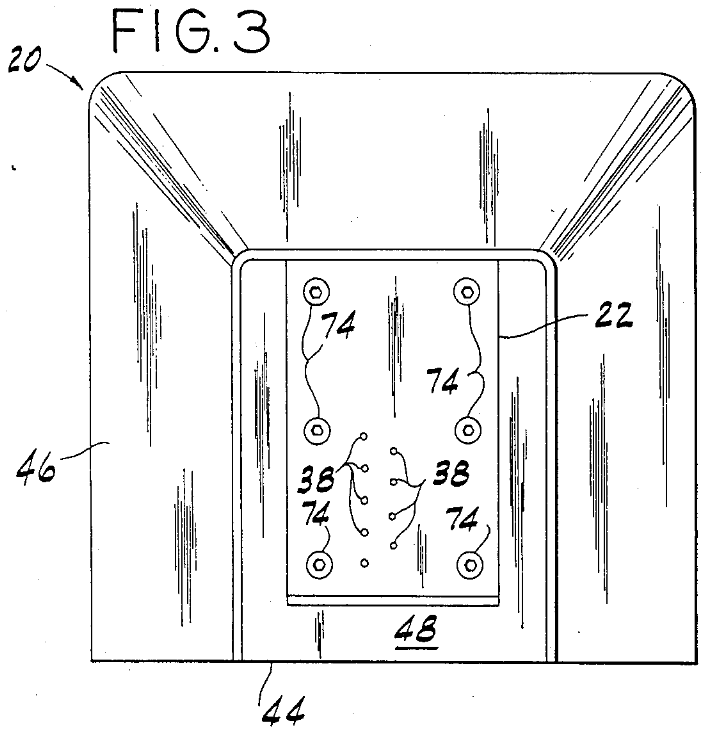
FIG. 3 is a front elevation view of the printhead, with the cowling in place.
Figure 4:
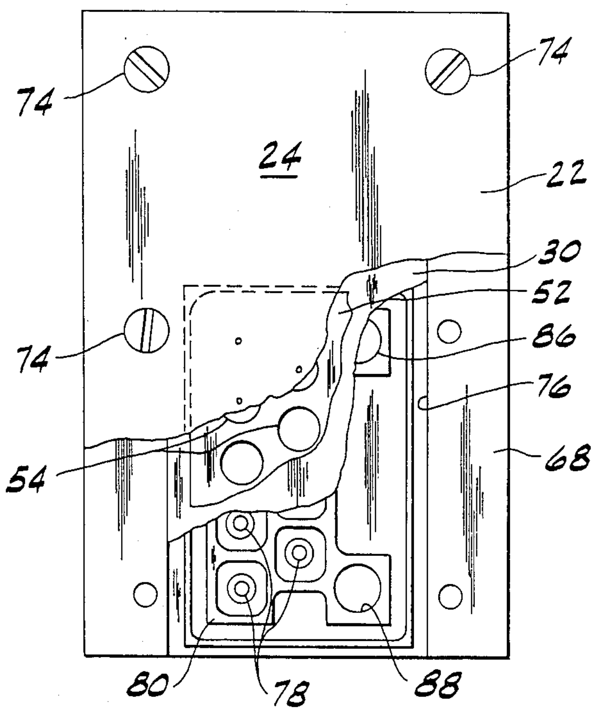
FIG. 4 is an enlarged front elevation view of the printhead, with portions broken away to show the back plate, membrane insert, and body.

A first embodiment of a printhead for an ink jet printing apparatus constructed according to the principles of this invention, indicated generally at 20 in FIGS. 1 and 3, is shown in FIGS. 1–7.

Figure 6:
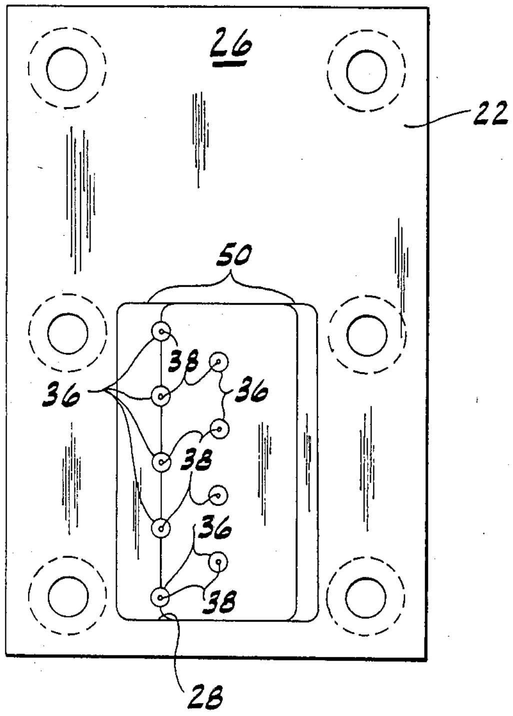
FIG. 6 is a rear elevation view of the body showing the recess and bosses.
Figure 7:
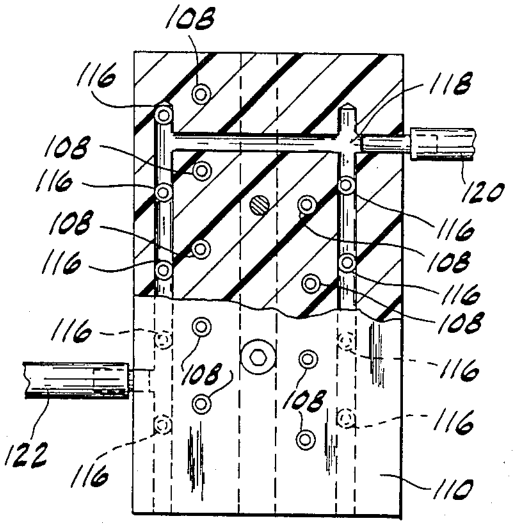
FIG. 7 is a front elevation view of a block with a portion broken away to show the interior.
Figure 8:
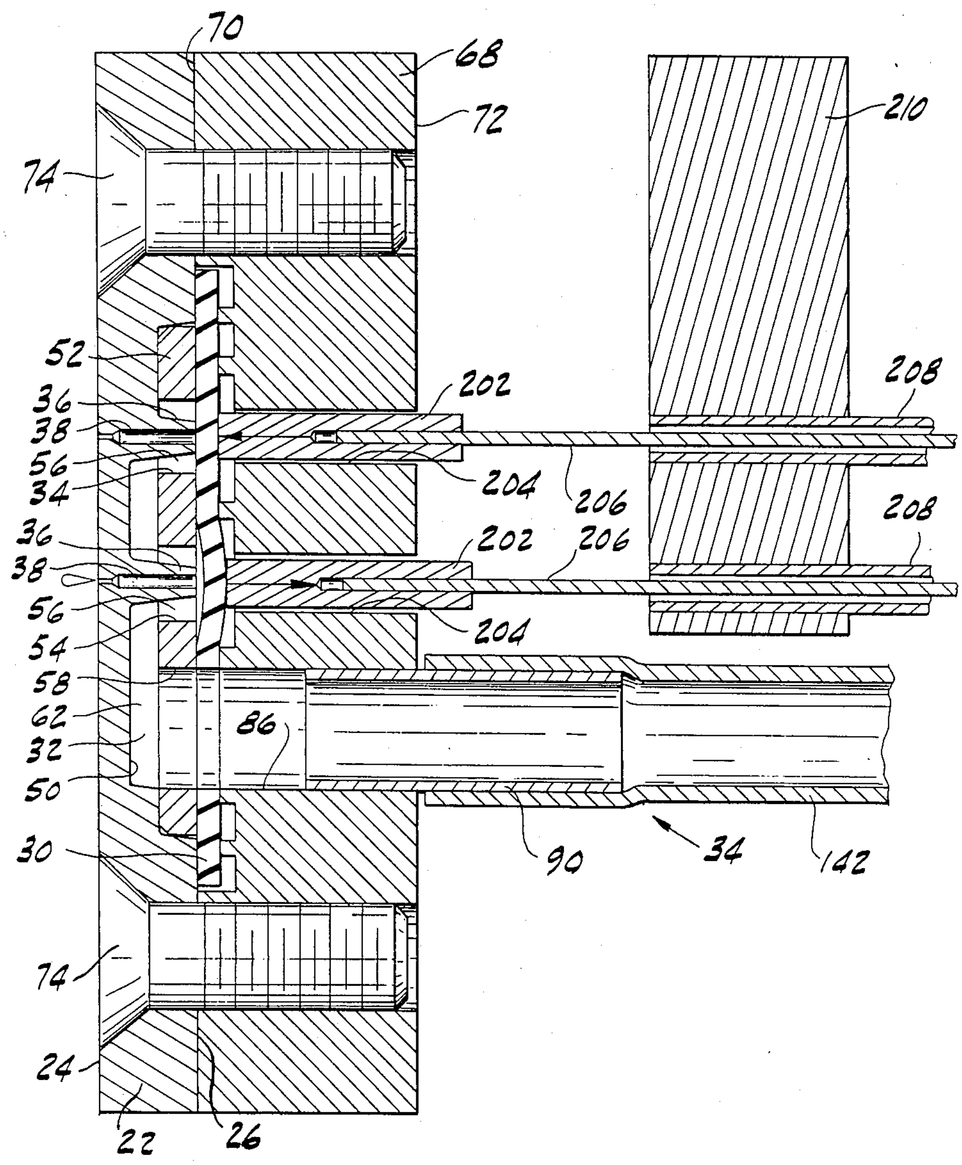
FIG. 8 is a partial cross-sectional view of the orifice portion of a second embodiment of a printhead for an ink jet printing apparatus constructed according to the principles of this invention.

In general, printhead 20 comprises a body 22 having a front face 24 and a rear or back face 26. As best shown in FIG. 6, a recess 28 is formed in the rear face 26 of body 22. A flexible membrane 30 extends over recess 28 forming a chamber 32 for ink, supplied to chamber 32 from a source under pressure 34. As best shown in FIG. 6, a plurality of posts or bosses 36 extend back from the bottom of recess 28, through chamber 32. An orifice 38 extends through each boss 36, from the back of boss 36 to the front face 24 of body 22. As best shown in FIG. 2, membrane 30 is engageable with the back ends of bosses 36 for closing the back ends of the orifices 38.

The orifices 38 are closely spaced, arranged in a matrix for non-contact printing of patterns cf data to form characters, such as letters of the alphabet on a target surface moving past the front face 24, adjacent to but spaced from the front face 24, by selective squirting of drops of ink from chamber 32 through the orifices 38 onto the target surface.

Printhead 20 also comprises means for holding membrane 30 against the back ends of bosses 36 to block the flow of ink from chamber 32 through orifices 38, and for selectively releasing membrane 30 to allow it to flex away from the back end of a selected boss 36 for delivery of a drop of ink from chamber 32 through the respective orifice 38. In general this means comprises a plurality of relatively slender elongate members 40, one for each boss 36, extending rearwardly from membrane 30, each elongate member 40 being generally aligned at its forward end with its respective boss 36. The elongate members 40 are thereby in a close-spaced relation, arranged at their inner ends in a closely spaced array corresponding to the matrix of orifices 38.

Release means 42 at the outer end of each elongate member 40 operate via their respective elongate members 40 to release the membrane 30 from their respective bosses 36 for the delivery of a drop of ink from chamber 32 through their respective orifices 38. Release means 42 are larger than the spacing of the bosses 36 and the orifices 38, and are thereby too large for arrangement of all of the release means 42 directly in line with the bosses 36. Therefore, release means 42 are arranged in an array spread out relative to the bosses 36, the elongate members 40 extending from their relatively closely spaced array at their inner ends to the release means 42 in their spread out array.

More specifically, printhead 20 comprises a frame 44, and a cowling 46 part of which is removed in FIG. 1. Frame 44 has a U-shaped bracket 48 for mounting body 22. The body 22 is preferably made from Delrin, an acetyl homopolymer, or some other suitable material. The orifices 38 can be formed with lasers or by drilling. As best shown in FIG. 6, the recess 28 in the body 22 has a relatively deeper section 50 that extends adjacent each boss 36.

An insert 52 is positioned in the recess 28 in body 22. The insert 52 has a hole 54 for receiving each boss 36 and defining an open space 56 adjacent each boss 36. Insert 52 also has at least one and preferably two inlet holes 58 and 60 for communicating with a source of ink. Insert 52 and recess 28 cooperate to define a passage 62 between the inlets 58 and 60 and the open spaces 56 around each boss 36. In the preferred embodiments, this passage 62 is formed by the deep portion 50 of recess 28. Alternatively a channel could be formed in insert 52, extending between the inlet holes 58 and 60 and the holes 54.

Figure 5:
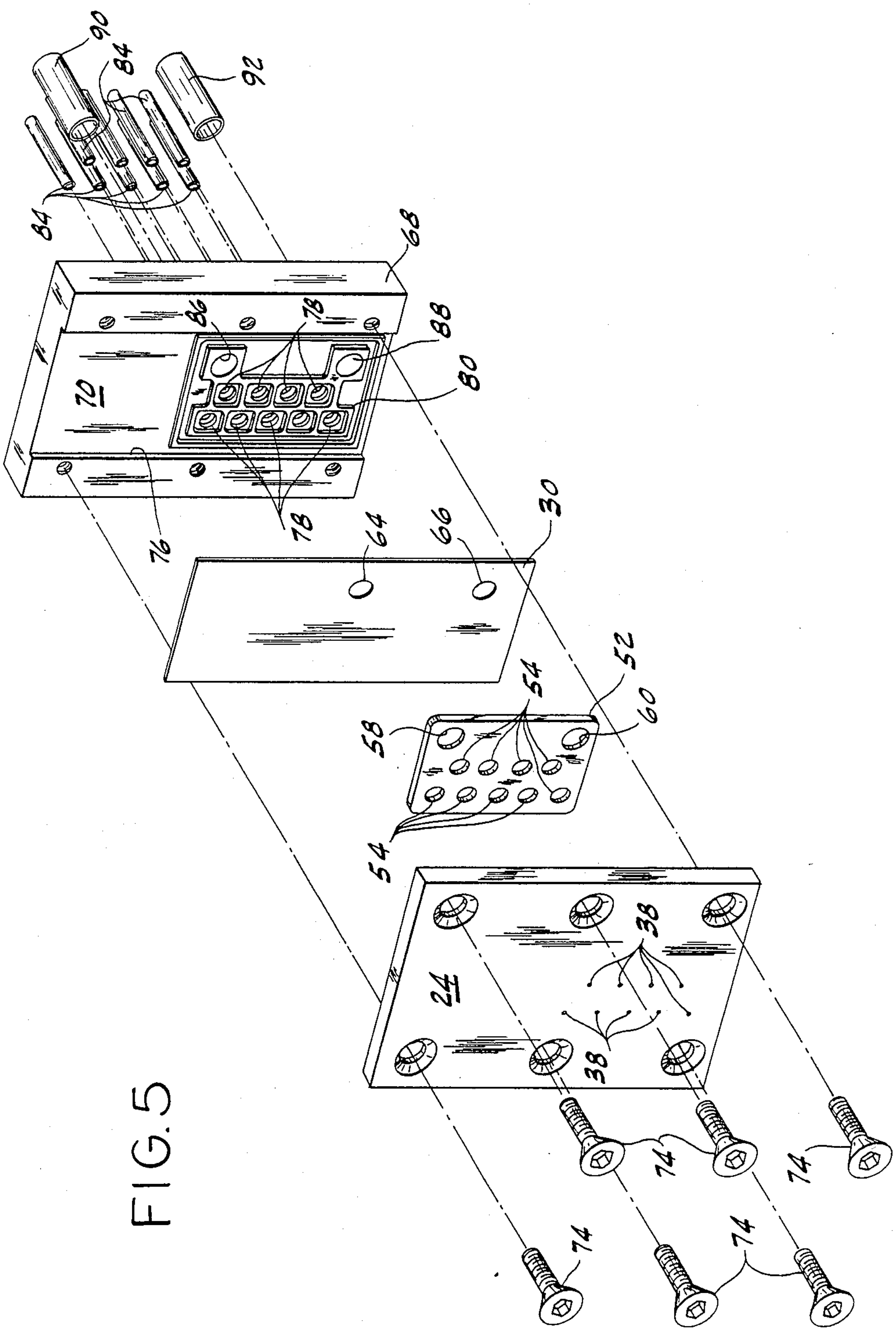
FIG. 5 is an exploded perspective view of the printhead showing the body, insert, membrane, and back plate.

Flexible membrane 30 can be die cut or stamped from an ethylene propylene co-polymer or other appropriate material approximately 0.015 to 0.03 inches thick. As shown in FIG. 5, membrane 30 has holes 64 and 66 aligned with holes 58 and 60, respectively.

A back plate 68 having front face 70 and back face 72 is engaged to the body 22, sandwiching membrane 30 therebetween. Back plate 68 and body 22 are secured with screws 74. The front face 70 of back plate 68 has a central recessed region 76 for receiving membrane 30. A hole 78 aligned with each boss 36, extends through back plate 68. Each hole 78 is surrounded by raised border 80, the front surface of which engages the membrane 30, sandwiching membrane 30 against the insert 52 and the body 22, forming a chamber 82 behind the membrane 30 aligned with each boss 36. A sleeve 84 extends from the back face 72 of back plate 68, aligned with each hole 78. Holes 86 and 88 extend through back plate 68, aligned with the holes 64 and 66 in membrane 30 and with the holes 58 and 60 in insert 52. Sleeves 90 and 92 extend from the back face 72 of back plate 68 from holes 86 and 88, respectively.

In this first embodiment, the elongate members 40 comprise air tubes 94. The inner ends of air tubes 94 fit over the sleeves 84. The outer ends of air tubes 94 are connected to release means 42. In this first embodiment the release means 42 comprise electrically operated air valves 96. Each valve 96 has electric leads 98 by which valve 96 can be operated between an unenergized position in which a first port 100 is connected to a common port 102, and an energized position in which a second port 104 is connected to common port 102. A tube 106 extends from each common port 102 and fits over a sleeve 108 extending through a block 110. The outer ends of air tubes 94 are fit over these sleeves 108 at the front of block 110.

The first port 100 of each valve 96 is connected to a source of air under pressure, so that when valves 96 are in their unenergized position air under pressure is supplied through valves 96 to air tubes 94 and thereafter to the chamber 82 at the back of membrane 30. A tube 114 extends from each first port 100 and fits over a sleeve 116 extending from the rear of block 110. Each sleeve 116 communicates with chamber 118 in block 110. Chamber 118 is supplied with air under pressure by two hoses 120 and 122 connected to opposite sides of block 110 and communicating with chamber 118 therein. The other ends of hoses 120 and 122 are connected via T-shaped connector 124 to air hose 126. Air hose 126 extends to a conector 128 at the back of frame 44. A hose 130 extending to a source of air under pressure, is fitted over connector 128.

The second port 104 of valve 96 is open to the atmosphere so that when valve 96 is in the energized condition, the air tubes 94 and thus the chamber 82 at the back of the membrane 30 are vented to the atmosphere.

The leads 98 of the valves 96 terminate in female plugs 132, which fit over pins (not shown) on a board 134. The pins are connected via wires (not shown) to cable 140 extending to a controller that generates the appropriate signals to create the desired characters.

Ink supply source 34 comprises a hose 142 fitted over sleeve 90. The hose 142 is provided with check valve 144 and a filter 146. The hose 142 is connected to coupling 148 at the rear of frame 44. A hose 150 is fitted over sleeve 92 and extends rearwardly. Hose 150 is connected to coupling 152 at the rear of frame 44. A source of ink under pressure can be connected to couplings 148 and 152.

Ink is supplied from the source, passes through coupling 148, through hose 142, through filter 146 and check valve 144, through inlet hole 86. The ink then travels through passage 62 to the open spaces 56 adjacent each boss 36.

Air is supplied from a source, through hose 130, through hose 126, to T-shaped connector 124 where it passes through hoses 120 and 122 to chamber 118 in block 110. The air passes though sleeve 116 to hoses 114, to port 100 of valve 96. When the valves 96 are in their unenergized state, the air passes through the valves 96, out the common ports 102, through tubes 106, sleeves 108, to tubes 94. The air is then conducted to chambers 82, where the air pressure acts against the back of membrane 30 to hold membrane 30 against the back ends of the bosses 36, blocking the orifices 38.

The air pressure is in the range between about 5.5 and about 8 p.s.i. The ink pressure is in the range between about 2 and about 6 p.s.i. During initial set up the pressure is set at predetermined values, for example 3 p.s.i. for the ink pressure and 7 p.s.i. for the air pressure. The system is then operated and adjusted to obtain the desired print quality. The ink pressure is adjusted to obtain the desired dot size. The air pressure is adjusted for clear printing. If the air pressure is too low, extra dots will be formed, if the air pressure is too high, dots in some of the characters may not be formed. The air pressure must be adjusted between these two limits which is different for each ink pressure setting.

To form a character the controller sends the appropriate signals via cable 140 through pins on board 134. The signals are conducted via plugs 132 to the leads of the appropriate valves 96, to momentarily energize those valves. When a valve 96 is in its energized state, air cannot pass into the port 100 and out the common port 102. Instead, port 104 is conected to common port 102. This allows the pressure in chamber 82 to vent through port 104, allowing membrane 30 to flex rearwardly, allowing ink in the open space 56 around each boss 36 to squirt out the orifice 38.

Figure 9:
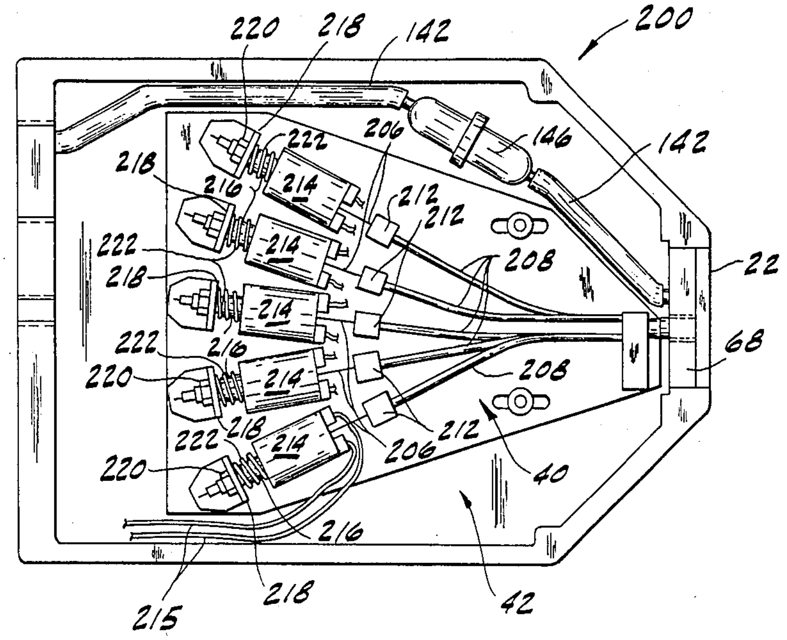
FIG. 9 is a top plan view of the printhead.
Figure 10:
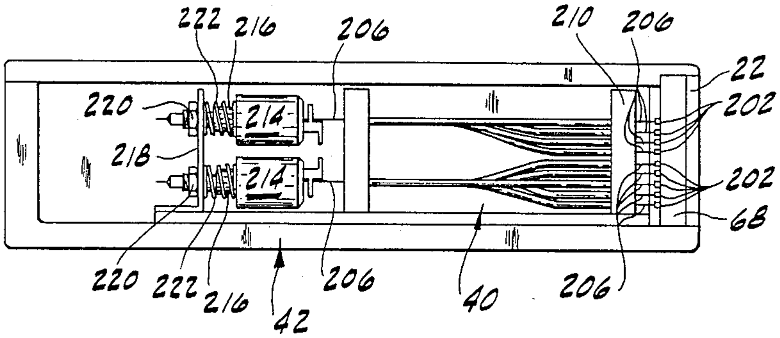
FIG. 10 is a side elevation view of the printhead.

A second embodiment of a printhead for an ink jet printer is indicated generally as 200 in FIGS. 9 and 10. Print head 200 is similar to printhead 20, with like parts being identified with the same numerals. However, the elongated means 40 and release means 42 in printhead 200 are different from the air hoses 94 and valves 96 of printhead 20.

In the second preferred embodiment, each means 40 comprises a head 202 slideably mounted in bores 204 in back plate 68. Heads 202 are sized and positioned so that they can impinge on the back of membrane 30, holding it against the backs of bosses 36, blocking orifices 38. A wire 206 extends rearwardly from each head 202. The head is enlarged relative to the wire. Wires 206 are each slideably mounted in a sleeve 208. The front end of sleeve 208 is engaged in support block 210. The rear end of sleeve 208 is engaged in block 212.

Release means 42 comprise solenoids 214 connected by leads 215 to a controller. Each wire 206 is connected to the plunger (not shown) of one of the solenoids. A threaded projection 216 extends from the rear of each solenoid. The projections 216 are secured to vertical webs 218 as with nuts 220. A coil spring 222 extends between each web 218 and the back of its associated solenoid 214. Nut 220 can be tightened to draw the solenoid rearwardly against the force of spring 222, or nut 220 can be loosened to allow solenoid to be biased forward by spring 222. The position of each head 202 is thereby adjustable to preload the membrane with a compressive force and to compensate for tolerance variations. If the solenoid is adjusted rearwardly, its corresponding head is adjusted rearwardly. Likewise if the solenoid is adjusted forwardly its corresponding head is adjusted forwardly, each solenoid containing a spring that biases the plunger and associated wire forward relative to the solenoid. Because of the preload, the heads apply pressure against the membrane which when released causes the membrane to spring away from the bosses, mechanically assisting the pressurized ink in moving the membrane out of engagement with the bosses. The amount of preload of each head is independently adjustable and, combined with the ability to electronically control the length of time the solenoid is energized, permits control of the amount of liquid expelled and thus the drop size.

To form a character the controller sends the appropriate signal via the leads 215 to the appropriate solenoids 214. The solenoids 214 are momentarily activated by the signal, the plunger pulling wires 206 and heads 202 rearwardly out of engagement with membrane 30 which allows membrane 30 to flex rearwardly and allows ink from the open spaces 56 around the bosses 36 to squirt from the selected orifices.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A printhead for ink jet printing apparatus comprising:

a body having a front face and a back face, said body having a recess in its back face, a flexible membrane over said recess forming a chamber for ink under pressure supplied to said chamber from a source under pressure, said body having a plurality of bosses extending back from the bottom of the recess through said chamber with an orifice extending through each boss from its back end to said front face of the body, said membrane being engageable with the back ends of said bosses for closing the back ends of said orifices, said bosses and orifices being in closely spaced relation and arranged in a matrix for non-contact printing of patterns of data to form characters such as letters of the alphabet on a target surface moving past the front face of said body adjacent to and spaced from said front face by selective squirting of drops of ink from said chamber through the orifices onto said target surface, means for holding the membrane pressed against the back ends of the bosses to block flow of ink from the chamber through the orifices and for selectively releasing the membrane to allow it to flex away from the back end of a selected boss for delivery of a drop of ink from the chamber through the respective orifice, said means comprising, a plurality of relatively slender elongate members, one for each boss, extending rearward from the back of the membrane, each of said elongate members being generally aligned at its end toward the membrane with a respective boss and said members thereby being in a closely spaced relation and arranged at their said end in an array corresponding to said matrix, means at the outer end of each of said elongate members each operable via the respective elongate member for releasing the membrane from the respective boss to enable the membrane to flex away from the respective boss for the delivery of a drop of ink from the chamber through the respective orifice, each release means, transversely of the respective elongate member, being larger than the spacing of the bosses and orifices and thereby being too large for arrangement of all said release means directly in line with said projections, said release means being arranged in in array wherein they are spread out relative to said bosses with said elongate members extending from their said relatively closely spaced array at their ends toward the membrane to said release means in their spread-out array.

2. A printhead as set forth in claim 1 wherein there is provided on the back of the membrane an auxiliary body with a plurality of air chambers therein, one for each boss, each aligned with the respective boss, and wherein said elongate members are air tubes and said release means are electrically operated valves, each valve being supplied with air under pressure from a source thereof and, when deenergized, supplying air under pressure to the respective air chamber for holding the membrane closed against the back end of the respective boss and, when momentarily energized, venting the chamber to release the membrane from the back end of the respective boss for squirting a drop of ink through the respective orifice onto to said target surface.

3. A printhead as set forth in claim 1 wherein said elongate members are flexible wires each having a head at its end toward the membrane for pressing the membrane against the back end of the respective boss and wherein said release means are solenoids, each solenoid when momentarily energized pulling the respective wire and head away from the membrane for squirting a drop of ink through the respective orifice onto said target surface, and wherein means is provided for biasing the wires for movement in the direction toward the membrane for pressing of the membrane against the back ends of the bosses by said heads on the wires.

4. A printhead for ink jet printing comprising:

a body having a front face and a back face and a recess in its back face, and a plurality of bosses extending back from the bottom of the recess, each boss having an orifice extending from the back faces of the bosses to the front face of the body;

an insert installed in the recess; the insert having a hole for receiving each boss and defining an open space adjacent each boss, the insert further having an ink receiving hole for receiving ink from a source under pressure, the insert and body cooperating to define a passage between the ink receiving hole and the open spaces adjacent each boss;

a flexible membrane over the rear face of the face plate; the membrane having a hole aligned with the ink receiving hole in the insert;

a back plate, having a front face and a back face, secured to the body with the membrane sandwiched therebetween, the back plate having a hole aligned with the hole in the membrane and the ink receiving hole in the insert for the passage of ink, the back plate further having an actuator hole aligned with each boss;

means associated with each actuator hole for releasably urging the membrane against its respective boss to close off communication between the open space around the boss and the orifice through the boss, when the membrane is released a drop of ink being squirt from the space adjacent the boss through the respective orifice onto a target surface.

5. A printhead as set forth in claim 4 wherein the means for releasably urging the membrane comprises:

an air chamber at the inner end of each actuator hole;

an air tube extending from each actuator hole and communicating with the chamber;

an electrically operated valve at the end of each tube; each valve being supplied with air under pressure from a source thereof and, when deenergized, supplying air under pressure to the respective air chamber for holding the membrane close against the back end of the respective boss and, when momentarily energized, venting the chamber to release the membrane from the back end of the respective boss for squirting a drop of ink through the respective orifice onto said target surface.

6. A printhead as set forth in claim 4 wherein the means for releasably urging the membrane comprises:

a flexible wire in each actuator hole, each wire having a head at its inner end for pressing the membrane against the back end of the respective boss;

a solenoid at the outer end of each wire, each solenoid when momentarily energized pulling the resepctive wire and head away from the membrane for squirting a drop of ink through the respective orifice onto said target surface, and means for biasing the wires toward the membrane for pressing of the membrane against the back ends of the bosses by said heads on the wires.

* * * * *